United States Patent
Takami et al.

[11] Patent Number: 6,156,457
[45] Date of Patent: Dec. 5, 2000

[54] LITHIUM SECONDARY BATTERY AND METHOD FOR MANUFACTURING A NEGATIVE ELECTRODE

[75] Inventors: Norio Takami; Asako Sato; Takahisa Osaki, all of Yokohama, Japan

[73] Assignee: Kabushiki Kaisha Toshiba, Kawasaki, Japan

[21] Appl. No.: 09/037,540

[22] Filed: Mar. 10, 1998

[30] Foreign Application Priority Data

Mar. 11, 1997 [JP] Japan ........................... 9-056299

[51] Int. Cl.⁷ ........................................ H01M 4/58
[52] U.S. Cl. ........................... 429/231.4; 429/231.8; 423/439
[58] Field of Search ................ 429/231.4, 231.8; 423/439

[56] References Cited

U.S. PATENT DOCUMENTS

| | | | |
|---|---|---|---|
| 5,284,722 | 2/1994 | Sugeno | 429/197 |
| 5,312,611 | 5/1994 | Takami et al. | |
| 5,656,394 | 8/1997 | Koksbang et al. | 429/218 |
| 5,698,341 | 12/1997 | Tamaki et al. | 429/218 |
| 5,714,279 | 2/1998 | Zajac, Jr. et al. | 429/194 |

FOREIGN PATENT DOCUMENTS

| | | |
|---|---|---|
| 5-251080 | 9/1993 | Japan . |
| 8-31422 | 2/1996 | Japan . |

OTHER PUBLICATIONS

E. Peled, et al., "Improved Graphite Anode for Lithium–Ion Batteries–Chemically Bonded Solid Electrolyte Interface and Nanochannel Formation", J. Electrochem. Soc., vol. 143, No. 1, Jan. 1996, pp. L4–L7.

Tsuyoshi Nakajima, et al., "Surface Fluorination and Oxidation of Carbon Materials for Negative Electrode of Lithium Ion Secondary Battery", Tanso, vol. 174, Oct. 1996, pp. 195–200.

J.R. Dahn, et al., "Density of States in Graphite Form Electrochemical Measurements on $Li_x(C_{1-z}B_z)_6$", Physical Review B, vol. 45, No. 7, Feb. 15, 1992, pp. 3773–3777.

Yoshiyuki Nishimura, et al., "Anode Performance of B–Doped Mesophase Pitch–Based Carbon Fibers in Lithium Ion Secondary Batteries", Tanso, vol. 172, May 1996, pp. 89–94.

B. D. Cullity, "Elements of X–Ray Diffraction", Addison Wesley Publishers, pp. 398–402 (no month available), 1978.

*Primary Examiner*—Carol Chaney
*Attorney, Agent, or Firm*—Oblon, Spivak, McClelland, Maier & Neustadt, P.C.

[57] ABSTRACT

This invention provides a lithium secondary battery comprising a positive electrode, and a negative electrode comprising a carbonaceous material which is capable of absorbing or desorbing lithium ion, wherein the carbonaceous material comprises 1 to 10% by weight of boron and 0.1 to 1% by weight of oxygen, and has an intensity ratio ($P_{101}/P_{100}$) i.e., a ratio in intensity of a (101) diffraction peak $P_{101}$ to a (100) diffraction peak $P_{100}$ as measured by means of powder X-ray diffraction, of 2 or more.

18 Claims, 1 Drawing Sheet

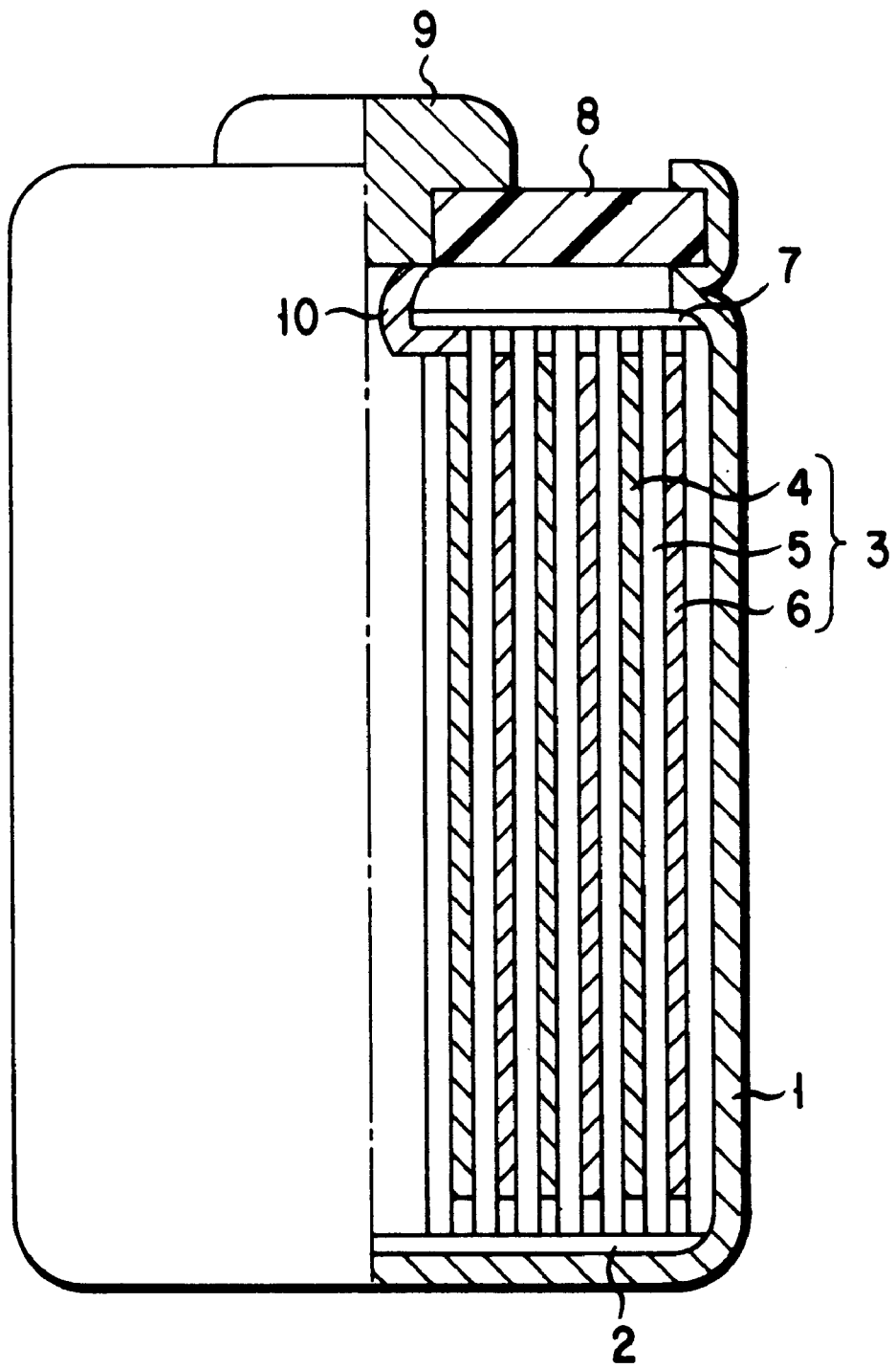
FIGURE

LITHIUM SECONDARY BATTERY AND METHOD FOR MANUFACTURING A NEGATIVE ELECTRODE

BACKGROUND OF THE INVENTION

This invention relates to a lithium secondary battery and to a method of manufacturing a negative electrode. In particular, this invention relates to a lithium secondary battery provided with an improved negative electrode comprising a carbonaceous material, and to a method of manufacturing a negative electrode wherein the method of manufacturing the carbonaceous material is improved.

In recent years, a nonaqueous electrolyte secondary battery using lithium as a negative electrode active material has been attracting attentions as a high energy density battery. Among such nonaqueous electrolyte secondary batteries, a primary battery using manganese dioxide ($MnO_2$), carbon fluoride [$(CF_2)n$] or thionyl chloride ($SOCl_2$) as a positive electrode active material has been widely used already as a power source of a timepiece or an electronic calculator, or as a backup battery of a memory.

In addition, with an increasing minimization in size and weight of various types of electronic equipment, such as VTR devices or communication equipments, a demand for a secondary battery having a high energy density as a power source for these equipments has been increased, and therefore, the development of lithium secondary battery employing lithium as a negative active material has been actively studied.

For example, studies are now continued to develop a lithium secondary battery which is featured in that the negative electrode thereof is constituted by lithium, an electrolyte is constituted by a nonaqueous electrolyte which can be prepared by dissolving a lithium salt such as $LiClO_4$, $LiBF_4$ or $LiAsF_6$ in a nonaqueous solvent such as propylene carbonate (PC), 1,2-dimethoxyethane (DME), γ-butyrolactone (γ-BL) or tetrahydrofuran (THF), or constituted by a lithium ion-conductive solid electrolyte, and a positive electrode active material is constituted by a compound which is capable of topochemically reacting with lithium such as $TiS_2$, $MoS_2$, $V_2O_5$, $V_6O_{13}$ and $MnO_2$ for instance.

However, the lithium secondary battery as mentioned above has not been put into practical use yet. This is mainly because the charge/discharge efficiency of the battery is low and the number of charge/discharge time (or cycle life) thereof is still insufficient. The cause for this poor performance is assumed to be ascribed to the fact that lithium constituting the negative electrode is degraded due to a reaction with a nonaqueous electrolyte. Namely, lithium dissolved in the nonaqueous electrolyte in the form of lithium ions during the discharging reacts with a solvent as it is precipitated at the moment of charging thereby causing the surface of the lithium to be partially inactivated. Therefore, if the charge/discharge is repeated, lithium is precipitated in the form of dendrites or small spheres, or is separated from the collector.

For these reasons, there has been proposed to employ, as a negative electrode for a lithium secondary battery, a carbonaceous material which is capable of absorbing or desorbing lithium ions such as coke, sintered resin, carbon fibers or pyrolytic epitaxial carbon so as to prevent the degradation in performance of a negative electrode that may be brought about by a reaction between lithium and a nonaqueous electrolyte or by the precipitation of dendrite.

It is now considered that the charge/discharge of a negative electrode comprising the aforementioned carbonaceous materials is mainly performed by the movement of lithium ions entering into or getting out of an interfaces between layers constituting a laminate structure of carbon planes formed of carbon atoms (a graphite structure) in the carbonaceous material. For this reason, it is required to employ, as a negative electrode for a lithium secondary battery, a carbonaceous material which is developed more or less in graphitization. However, when a carbonaceous material to be employed as a negative electrode in a nonaqueous electrolyte is manufactured through the pulverization of a macro-crystal developed in graphitization, the decomposition of the nonaqueous electrolyte will be caused, resulting in the deterioration of capacity and charge/discharge efficiency of the battery.

Moreover, when quick charging is performed in this secondary battery provided with a negative electrode comprising a carbonaceous material or when the charging of this secondary battery is performed under conditions of low temperature of 0° C. or less, the charging potential of the negative electrode may become 0V or less, inviting a precipitation of lithium metal on the carbonaceous material. As a result, the quantity of absorption and desorption of lithium ions in such a secondary battery would be decreased, thus deteriorating the discharge capacity of the secondary battery under such severe conditions.

Meanwhile, Japanese Patent Unexamined Publication H/5-251080 discloses a coin type battery provided with a negative electrode comprising a carbonaceous material containing boron, wherein the negative electrode is manufactured by sintering a mixture consisting of natural graphite and an additive selected from $H_3BO_3$, B and $B_2O_3$ at a temperature of 1,000° C. in an Ar atmosphere for 10 hours. Further, Japanese Patent Unexamined Publication H/8-31422 discloses a lithium secondary battery provided with a negative electrode comprising a carbonaceous material containing boron, wherein the negative electrode is manufactured by a method wherein pitch coke lump obtained from coal-tar pitch is pulverized at first to obtain a powder, which is then mixed with a material selected from B, $B_2O_3$, $B_4C$ and $H_3BO_3$ and graphitized. On the other hand, Tanso 1996 {No. 172} 89–94 discloses a lithium secondary battery provided with a negative electrode comprising a carbonaceous material containing boron, wherein the negative electrode is manufactured by a method wherein a mesophase pitch type carbon fiber is infusibilized at first at a temperature of 300° C. in air atmosphere and then heated at a temperature of 650° C. to perform a primary carbonization thereof, and after being added with $B_4C$, the resultant mixture is heat-treated at a temperature of 3,000° C. for one hour.

However, any of these secondary batteries have failed to solve the aforementioned problems.

BRIEF SUMMARY OF THE INVENTION

Accordingly, an object of the present invention is to provide a lithium secondary battery provided with an improved negative electrode, thereby making it possible not only to improve the initial charge/discharge efficiency, discharge capacity and charge/discharge cycle life, but also to suppress any deterioration of discharge capacity at the occasion of quick charging or in the use thereof under a low temperature environment.

Another object of this invention is to provide a method of manufacturing a negative electrode which enables to obtain a lithium secondary battery, which is not only capable of improving the initial charge/discharge efficiency, discharge capacity and charge/discharge cycle life, but also capable of suppressing any deterioration of discharge capacity at the occasion of quick charging or in the use thereof under a low temperature environment.

Namely, according to the present invention, there is provided a lithium secondary battery comprising a positive electrode, and a negative electrode comprising a carbonaceous material which is capable of absorbing or desorbing lithium ion;

wherein the carbonaceous material comprises 1 to 10% by weight of boron and 0.01 to 1% by weight of oxygen, and has an intensity ratio ($P_{101}/P_{100}$), i.e., a ratio in intensity of a (101) diffraction peak $P_{101}$ to a (100) diffraction peak $P_{100}$ as measured by means of powder X-ray diffraction, of 2 or more.

According to the present invention, there is further provided a method of manufacturing a negative electrode comprising a carbonaceous material which is capable of absorbing or desorbing lithium ion;

wherein the carbonaceous material is formed by a method comprising a step of;

heat-treating a mixture comprising a graphitized carbon-based material and a boron oxide at a temperature of 1,500 to 3,000° C. in an inert gas atmosphere.

According to the present invention, there is further provided an alternative method of manufacturing a negative electrode comprising a carbonaceous material which is capable of absorbing or desorbing lithium ion;

wherein the carbonaceous material is formed by a method comprising the steps of;

heat-treating a mixture comprising a carbon-based material and a boron compound at a temperature of 1,500 to 3,000° C. in an inert gas atmosphere; and further heat-treating the heat-treated mixture at a temperature of 400 to 800° C. in an oxidizing atmosphere.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGURE is a partially sectioned view of a lithium secondary battery according to one embodiment of the present invention.

DETAILED DESCRIPTION OF THE INVENTION

This invention will be further explained with reference to a lithium secondary battery (for example, a cylindrical lithium secondary battery) as shown in FIGURE.

Referring to FIGURE, a bottomed cylindrical case 1 made of stainless steel for example is provided at the bottom thereof with an insulating body 2. An electrode assembly (a group of electrodes) 3 is housed in the cylindrical case 1. The electrode assembly 3 is constructed such that a strip-like laminate body comprising a positive electrode 4, a separator 5 and a negative electrode 6 stacked in this order is spirally wound.

The cylindrical case 1 is filled with an electrolyte. An insulating paper 7 having an opening at the center is disposed over the electrode assembly 3 placed in the cylindrical case 1. An insulating seal plate 8 is mounted at the upper opening of the cylindrical case 1 and hermetically fixed to the cylindrical case 1 by caulking the upper opening of the cylindrical case 1. A positive electrode terminal 9 is fitted in the central opening of the insulating seal plate 8. One end of a positive electrode lead 10 is connected to the positive electrode 4 and the other end thereof is connected to the positive electrode terminal 9. The negative electrode 6 is connected via a negative lead (not shown) to the cylindrical case 1 functioning as a negative terminal.

Next, the details of the positive electrode 4, the negative electrode 6 and the nonaqueous electrolyte will be explained.

(1) The Positive Electrode 4:

This positive electrode 4 can be manufactured by emulsifying a mixture comprising an active material for positive electrode, a conductor agent and a binder in a suitable solvent, coating the resultant emulsion on a collector and drying the emulsion to form a thin plate-like electrode.

As for the positive electrode active material, various kinds of oxides, such as manganese dioxide, lithium/manganese composite oxide such as $LiMn_2O_4$ or $LiMnO_2$, lithium-containing nickel oxide such as $LiNiO_2$, lithium-containing cobalt oxide such as $LiCoO_2$, lithium-containing nickel cobalt oxide, lithium-containing iron oxide and lithium-containing vanadium oxide; or chalcogen compounds such as titanium disulfide and molybdenum disulfide may be employed. Among them, lithium-containing cobalt oxide, lithium-containing nickel oxide and lithium/manganese composite oxide are preferable for use for obtaining a high voltage.

As for the conductor agent, acetylene black, carbon black or graphite for example may be used.

As for the binder, polytetrafluoroethylene (PTFE), polyvinylidene fluoride (PVdF), ethylene-propylene-diene copolymer (EPDM), styrene-butadiene rubber (SBR), etc. can be employed.

The mixing ratios of these active material, conductor agent and binder should preferably be 80 to 95% by weight, 3 to 20% by weight, and 2 to 7% by weight, respectively.

As for the current collector, aluminum foil, stainless foil and nickel foil for instance can be employed.

(2) The Separator 5:

As for the separator 5, a synthetic resin non-woven fabric, polyethylene porous film, polypropylene porous film, etc. can be employed.

(3) The Negative Electrode 6:

The negative electrode 6 comprises a carbonaceous material which is capable of absorbing or desorbing lithium ion. The carbonaceous material comprises 1 to 10% by weight of boron and 0.01 to 1% by weight of oxygen. And the carbonaceous material has an intensity ratio of a (101) diffraction peak $P_{101}$ to a (100) diffraction peak $P_{100}$ of graphite crystal as measured by means of powder X-ray diffraction, i.e. ($P_{101}/P_{100}$) is 2 or more.

This ratio of peaks ($P_{101}/P_{100}$) can be obtained by measuring the height of the diffraction peak $P_{101}$ of (101) plane and the height of the diffraction peak $P_{100}$ of (100) plane which are obtained by powder X-ray diffraction, and then calculating the ratio of the peak height of the diffraction peak $P_{101}$ in relative to the peak height of the diffraction peak $P_{100}$. In the measurement of the powder X-ray diffraction, CuK α is employed as the X-ray source, and a high purity silicon is employed as a standard reference material.

The boron may be existed in the carbonaceous material in the state of atom or compound. Preferably, the boron should be included in the carbonaceous material as a solid solution. However, if the content of boron compounds in the carbonaceous material is too large, the performance of the lithium secondary battery may be deteriorated.

It is possible, when the content of boron is confined to the aforementioned range, to enhance the lithium ion absorption and desorption potential of the negative electrode, so that it is now possible to inhibit lithium metal from being precipitated on the carbonaceous material at the occasion of quick charging or at the occasion of charging/discharging under a low temperature (0° C. or less) environment. Further, since the crystallinity of graphite can be improved, it is possible to improve the rate of lithium ion absorption and desorption in the negative electrode, and hence to improve the discharge capacity of the negative electrode. If the content of boron is less than 1% by weight, it would become difficult to sufficiently enhance not only the lithium ion absorption and desorption potential but also the crystallinity of graphite. On the other hand, if the content of boron exceeds over 10% by weight, a $B_4C$ compound would be generated in the carbonaceous material. Since this $B_4C$ compound is incapable of taking part in the absorption and desorption of lithium ion, the capacity of the negative electrode would be deteriorated. As the content of boron in the carbonaceous material becomes larger, the content of boron compound tends to become larger. The content of boron should preferably be in the range of from 1 to 7% by weight, more preferably from 1 to 5% by weight, still more preferably from 1 to 3% by weight, most preferably from 1.5 to 2.5% by weight.

The oxygen may be existed in the carbonaceous material in the state of atom or compound. Preferably, the oxygen should be included in the carbonaceous material as being bonded to carbon. However, if the content of oxides in the carbonaceous material is too large, the performance of the lithium secondary battery may be deteriorated.

It is possible, when the content of oxygen is confined to the aforementioned range, to enhance the lithium ion absorption and desorption potential of the negative electrode, in particular the absorption and desorption potential at the initial charging/discharging, so that it is now possible to enhance the initial charging/discharging efficiency and hence to enhance the discharge capacity. Further, it is assumed that oxygen atom in the carbonaceous material is bonded to carbon atom and existed mainly on the surface of the carbon plane. As a result, the oxygen atom functions as a protective layer for the carbonaceous material against the nonaqueous electrolyte, so that the reduction decomposition reaction of the nonaqueous electrolyte at the initial charging/discharging can be suppressed, thereby improving the initial charging/discharging efficiency. If the content of oxygen is less than 0.01% by weight, it would become difficult to sufficiently enhance the lithium ion absorption and desorption potential. On the other hand, if the content of oxygen exceeds over 1% by weight, the reduction decomposition reaction of the nonaqueous electrolyte due to oxygen atom may be caused to occur. As the content of oxygen in the carbonaceous material becomes larger, the content of oxygen compound tends to become larger. The content of oxygen should preferably be in the range of from 0.01 to 0.5% by weight, more preferably from 0.01 to 0.1% by weight, most preferably from 0.015 to 0.05% by weight.

The carbonaceous material exhibiting a value of 2 or more in the aforementioned intensity ratio ($P_{101}/P_{100}$) is well-developed (larger) in the plane extending along the a-axis of the graphite crystallite, so that the absorbing and desorbing sites of lithium ion can be increased thereby to improve the discharge capacity. On the other hand, if the aforementioned intensity ratio ($P_{101}/P_{100}$) of carbonaceous material is less than 2, the plane thereof extending along the a-axis of the graphite crystallite is less developed, so that the absorbing and desorbing sites of lithium ion would be restricted. In particular, in view of further improving the discharge capacity, the aforementioned intensity ratio should preferably be 2.1 or more. By the way, preferable upper limit of the aforementioned intensity ratio is 5.

The specific surface area of the carbonaceous material should preferably be 0.3 $m^2/g$ to 10 $m^2/g$. There is a tendency that the larger the specific surface area of the carbonaceous material is, the higher the content of oxygen is. Therefore, it is assumed that the oxygen is mainly existed on the surface of the carbonaceous material. Thus, it is possible, by limiting the specific surface area of the carbonaceous material to the aforementioned range, to suitably control the content of oxygen on the surface of the carbonaceous material, whereby assumably making it possible to enhance the initial charge/discharge efficiency and to improve the capacity and life of battery under severe conditions such as low temperature environments or quick charging. Preferable range of the specific surface area of the carbonaceous material is from 0.5 $m^2/g$ to 5 $m^2/g$.

The carbonaceous material can be existed in the negative electrode in the form of fiber, particle or a mixture of fiber and particle. Fibrous carbonaceous material (hereinafter referred to as carbon fiber) and particulate carbonaceous material (hereinafter referred to as carbon particle) should preferably be provided with the following features as explained in the following items (1) and (2).

(1) Carbon fiber

The carbon fiber may be or may not be the one which has been subjected to a pulverization treatment.

The average length of the carbon fiber should preferably be in the range of 10 to 100 μm.

The average diameter of the carbon fiber should preferably be in the range of 1 to 20 μm.

When the average length of the carbon fiber is in the range of 10 to 100 μm and the average diameter thereof is in the range of 1 to 20 μm, the aspect ratio of the carbon fiber should preferably be in the range of from 2 to 10. The aspect ratio in this case is calculated as a ratio of average length in relative to the average diameter of the carbon fiber.

The orientation in graphite crystallite of the carbon fiber should preferably be radial type or isotropic in cross-section. Examples of this radial type orientation include an orientation belonging to a lamella type or belonging to a Brooks-Taylor type. The carbon fiber may have an irregularity in orientation of the graphite crystallite.

If a pulverized carbon fiber is to be employed, the average particle diameter thereof should preferably be in the range of 1 to 100 μm, more preferably in the range of 2 to 40 μm.

(2) Carbon Particle

The shape of carbon particle should preferably be spherical or approximately spherical.

The average diameter of carbon particle should preferably be in the range of 1 to 100 μm, more preferably in the range of 2 to 40 μm.

The ratio of the shorter diameter of carbon particle to the longer diameter of carbon particle should preferably be ¹⁄₁₀ or more, more preferably ½ or more, i.e. approximately spherical in shape.

The carbon particle should preferably have a radial type orientation of graphite crystallite in cross-section, or an isotropic orientation of graphite crystallite in cross-section. Examples of this radial type orientation include an orientation belonging to a lamella type or to a Brooks-Taylor type. The carbon particle may have an irregularity in orientation of the graphite crystallite.

The carbonaceous material can be manufactured according to the following methods (1) and (2) for instance.

(1) A graphitized carbon-based material and a boron oxide (preferably 1 to 10%, more preferably 1 to 5%, by weight on the basis of the graphitized carbon-based material) are mixed together to obtain a mixture, which is then heat-treated at a temperature of 1,500 to 3,000° C. in an inert gas atmosphere, thereby obtaining a carbonaceous material containing 1 to 10% by weight of boron and 0.01 to 1% by weight of oxygen, and exhibiting an intensity ratio ($P_{101}/P_{100}$) of 2 or more. The carbonaceous material which is manufactured according to the aforementioned method is assumed to have a structure wherein the boron is retained in the carbonaceous material as a solid solution, and the oxygen is bonded to carbon in the carbonaceous material. This carbonaceous material may contain an unreacted material such as a boron oxide.

If an ungraphitized carbon-based material is employed in the aforementioned method (1), oxygen atom in the boron oxide would be released outside in the form of carbon dioxide gas ($CO_2$) during the heat treatment, so that it may become difficult to introduce oxygen atom into the carbonaceous material. Examples of the graphitized carbon-based material include artificial graphite, natural graphite, graphitized coke, graphitized mesophase pitch-based fiber, and graphitized mesophase pitch-based globule.

As for the boron oxide, diboron trioxide ($B_2O_3$) for instance can be employed.

If the mixing ratio of the boron oxide falls outside the aforementioned range, the content of boron in the carbonaceous material may fall outside the aforementioned range of 1 to 10% by weight.

As for the inert gas atmosphere, an argon gas atmosphere for instance can be employed.

The reason for limiting the range of temperature in the aforementioned heat treatment is as follows. Namely, when the temperature of heat treatment is lower than 1,500° C., it may become difficult to form a solid solution consisting of carbon atom and boron atom, and hence the content of boron compound in the carbonaceous material may become excessive. In the meantime, it is not easy in technical viewpoint to make the temperature of heat treatment higher than 3,000° C. Therefore, a preferable range of this heat treatment temperature is from 1,500 to 2,800° C.

(2) A carbon-based material and a boron compound (preferably 1 to 10%, more preferably 1 to 5%, by weight on the basis of the carbon-based material) are mixed together to obtain a mixture, which is then heat-treated at a temperature of 1,500 to 3,000° C. in an inert gas atmosphere and further heat-treated at a temperature of 400 to 800° C. in an oxidizing atmosphere, thereby obtaining a carbonaceous material containing 1 to 10% by weight of boron and 0.01 to 1% by weight of oxygen, and exhibiting an intensity ratio ($P_{101}/P_{100}$) of 2 or more. The carbonaceous material which is manufactured according to the aforementioned method is assumed to have a structure wherein the boron is retained in the carbonaceous material as a solid solution, and the oxygen is bonded to carbon in the carbonaceous material. This carbonaceous material may contain an unreacted material such as a boron compound or a boron oxide.

Examples of the carbon-based material include artificial graphite, natural graphite, coke, mesophase pitch-based fiber, and mesophase pitch-based globule. These carbon-based materials may be of graphitized materials. Further, these carbon-based materials may be infusibilized before use if required.

As for the boron compound, boron carbide ($B_4C$), boric acid ($H_3BO_3$), diboron trioxide ($B_2O_3$), etc. can be employed.

If the mixing ratio of the boron compound falls outside the aforementioned range, the content of boron in the carbonaceous material may fall outside the aforementioned range of 1 to 10% by weight.

As for the inert gas atmosphere, an argon gas atmosphere for instance can be employed.

The reason for limiting the range of temperature in the aforementioned heat treatment in an inert gas atmosphere is as follows. Namely, when the temperature of heat treatment is lower than 1,500° C., it may become difficult to form a solid solution consisting of carbon atom and boron atom, and hence the content of boron compound in the carbonaceous material may become excessive. In the meantime, it is not easy in technical viewpoint to make the temperature of heat treatment higher than 3,000° C. Therefore, a preferable range of heat treatment temperature is from 1500 to 2800° C.

The oxidizing atmosphere may be formed by making use of air or oxygen gas.

The reason for limiting the range of temperature in the aforementioned heat treatment in an oxidizing atmosphere is as follows. Namely, when the temperature of heat treatment is lower than 400° C., it may become difficult to introduce oxygen atom into the carbonaceous material. In the meantime, if the heat treatment temperature is higher than 800° C., the surface of carbonaceous material would become rugged, thus making it difficult to improve the capacity and capacity-retaining ratio of secondary battery. Therefore, a preferable range of this heat treatment temperature is from 650 to 700° C.

The content of oxygen in the carbonaceous material can be controlled by adjusting the concentration of oxygen gas in the oxidizing atmosphere, or by adjusting the heat treatment temperature or the heat treatment time in the oxidizing atmosphere.

The negative electrode 6 can be manufactured by a method comprising the steps of; kneading the carbonaceous material and a binder together with a suitable solvent, coating the resultant emulsion on a collector, drying the emulsion and subjecting the resultant body to a single compression treatment or a multi-stage (2 to 5 times) compression treatment under a predetermined pressure.

As for the binder, polytetrafluoroethylene (PTFE), polyvinylidene fluoride (PVdF), ethylene-propylene-diene copolymer (EPDM), styrene-butadiene rubber (SBR) or carboxymethyl cellulose (CMC) for example may be employed.

Preferable mixing ratio of the carbonaceous material and the binder may be: 90 to 98% by weight for carbonaceous material, and 2 to 10% by weight for the binder. In particular, the quantity of the carbonaceous material should preferably be in the range of 5 to 20 mg/cm$^2$ as measured when the carbonaceous material is formed into the negative electrode 6.

As for the current collector, copper foil, stainless foil and nickel foil for example may be employed.

(4) The Electrolyte:

The nonaqueous electrolyte to be employed herein may be produced by dissolving an electrolytic salt in an nonaqueous solvent.

As for the nonaqueous solvent, any known nonaqueous solvent which has been employed as a solvent for a lithium secondary battery can be employed. Although it is not intended to be limited, a nonaqueous solvent mainly consisting or a mixed solvent comprising ethylene carbonate (EC) and at least one kind of nonaqueous solvent whose melting point is lower than that of aforementioned ethylene carbonate and whose donor number is 18 or less (hereinafter referred to as a second solvent) may be preferably employed.

Preferable examples of the second solvent are linear carbons. Typical examples of them are dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), toluene, xylene and methyl acetate (MA). These second solvents may be employed singly or in combination of two or more. More desirably, this second solvent should be selected from those having a donor number of 16.5 or less.

The viscosity of this second solvent should preferably be 28 mp or less at a temperature of 25° C.

The mixing ratio of the aforementioned ethylene carbonate in the mixed solvent should preferably be 10 to 80% by volume. More preferable mixing ratio of the ethylene carbonate is 20 to 75% by volume.

Preferable examples of the composition of the aforementioned mixed solvent are EC and MEC; EC, PC and MEC; EC, MEC and DEC; EC, MEC and DMC; and EC, MEC, PC and DEC; with the volume ratio of MEC being controlled within the range of 30 to 80%, more preferably 40 to 70%.

As for the electrolytic salt to be incorporated into the nonaqueous electrolyte, a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluorometasulfonate ($LiCF_3SO_3$) and bis-trifluoromethyl sulfonylimide lithium [$LiN(CF_3SO_2)_2$] may be employed. Among them, $LiPF_6$, $LiBF_4$ and $LiN(CF_3SO_2)_2$ are preferable for use.

The content of aforementioned electrolytic salts in the nonaqueous solvent should preferably be 0.5 to 2.0 mol/l.

The lithium secondary battery according to this invention is provided with a negative electrode which contains a carbonaceous material comprising 1 to 10% by weight of boron and 0.01 to 1% by weight of oxygen and having an intensity ratio ($P_{101}/P_{100}$), i.e., a ratio in intensity of a (101) diffraction peak $P_{101}$ to a (100) diffraction peak $P_{100}$ as measured by means of powder X-ray diffraction, of 2 or more.

Since this carbonaceous material is well-developed in the plane thereof extending along the a-axis of the graphite crystallite, the absorbing and desorbing sites of lithium ion can be increased. Further, it is possible according to this negative electrode to enhance the absorption and desorption potential of lithium ion. For example, when it is assumed that the content of boron is 0.2% by weight, the content of oxygen is 0.02% by weight and the intensity ratio is 2.2, the potential (VS. Li/Li$^+$) can be increased by a voltage of 10 to 30 mV. In particular, since it is possible according to this negative electrode to greatly enhance the absorption and desorption potential in the initial charging/discharging, the initial charge/discharge efficiency can be improved. Therefore, since it is possible to improve the quantity of absorption and desorption of lithium ions in the negative electrode, the secondary battery comprising such a negative electrode can be improved in discharge capacity and in charge/discharge cycle life. Furthermore, since the absorption and desorption potential of lithium ion in the negative electrode can be made higher than 0V at the occasion of quick charging or at the occasion of use under a low temperature environment, the quantity in precipitation of lithium metal can be greatly minimized. As a result, it is possible according to this secondary battery to maintain a high discharge capacity at the occasion of quick charging or at the occasion of use under a low temperature environment, and hence to realize a longer charge/discharge cycle life.

Additionally, it is possible, by confining the specific surface area of the carbonaceous material to the range of 0.3 m$^2$/g to 10 m$^2$/g, to optimize the quantity of oxygen on the surface of the carbonaceous material. As a result, it is possible to further improve the initial charge/discharge efficiency and also to enhance the discharge capacity and capacity retention ratio, in particular, at the occasion of quick charging or at the occasion of use under a low temperature environment. It is also possible, by making the shape of the carbonaceous material having the aforementioned range of specific surface area into a fibrous or particulate form, to optimize the quantity of oxygen on the surface of the carbonaceous material. As a result, it is possible to prominently improve the discharge capacity and capacity retention ratio of the secondary battery.

When the carbonaceous material containing boron and oxygen in the aforementioned ranges and having an intensity ratio ($P_{101}/P_{100}$) of the aforementioned range is fibrous or particulate with the orientation of graphite crystallite thereof being radial type or isotropic, it is possible to greatly enhance the absorption/desorption rate of lithium ion in the negative electrode at the occasion of quick charging or at the use under a low temperature environment, so that the discharge capacity of the secondary battery under such a severe condition can be further improved.

According to the method of manufacturing a negative electrode of this invention, a carbonaceous material which constitutes the negative electrode and is capable of absorbing or desorbing lithium ion is manufactured by a method comprising the step of; heat-treating a mixture comprising a graphitized carbon-based material and a boron oxide at a temperature ranging from 1,500 to 3,000° C. in an inert gas atmosphere. The lithium secondary battery comprising a negative electrode constituted by the carbon-based material manufactured in this manner is capable of realizing a high capacity and a loner charge/discharge cycle life even under a severe condition such as quick charging or low temperature environment.

According to an alternative method of manufacturing a negative electrode of this invention, a carbonaceous material which is contained in the negative electrode and capable of absorbing or desorbing lithium ion is manufactured by a method comprising the steps of; heat-treating a mixture comprising a carbon-based material and a boron compound at a temperature of 1,500 to 3,000° C. in an inert gas atmosphere, and further heat-treating the heat-treated mixture at a temperature of 400 to 800° C. in an oxidizing atmosphere. The lithium secondary battery comprising a negative electrode comprising the carbonaceous material that has been manufactured in this manner is capable of realizing a high capacity and a loner charge/discharge cycle life even under a severe condition such as quick charging or low temperature environment.

This invention will be further explained with reference to the following examples and FIG.

EXAMPLE 1

(Preparation of a positive electrode)

First of all, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture, which was then coated on an aluminum foil (30 μm) collector. The resultant aluminum foil collector was press-worked to obtain a positive electrode.

(Preparation of a negative electrode)

Artificial graphite powder which was spherical in shape and 15 μm in average particle diameter was mixed with 3% by weight of diboron trioxide ($B_2O_3$) powder and then heat-treated at a temperature of 2,000° C. in an Ar gas stream thereby to obtain a spherical carbonaceous material. The carbonaceous material thus obtained contained 1% by weight of boron and 0.03% by weight of oxygen. When the intensity ratio of a (101) diffraction peak $P_{101}$ to a (100) diffraction peak $P_{100}$ in powder X-ray diffraction, i.e. ($P_{101}/P_{100}$) was measured, the ratio was found 3. Further, when the interplanar spacing $d_{002}$ derived from (002) reflection of the carbonaceous material was calculated from the location of peaks in the diffraction diagram obtained by the powder X-ray diffraction, the interplanar spacing $d_{002}$ was found 0.3354 nm. When the specific surface area of the carbonaceous material was measured by means of $N_2$ gas adsorption BET method, the specific surface area was found 5 $m^2/g$. The average particle diameter of the carbonaceous material was 15 μm. When the cross-section of the carbonaceous material was observed by means of SEM (scanning electron microscope), the orientation of the graphite crystallite was found as being isotropic.

Then, 96.7% by weight of the carbonaceous material, 2.2% by weight of styrene-butadiene rubber and 1.1% by weight of carboxylmethyl cellulose were mixed together to obtain a mixture, which was then coated on a copper foil collector and dried. The resultant copper foil collector was then press-worked to obtain a negative electrode.

The positive electrode, a separator composed of a polyethylene porous film and the negative electrode were stacked in this order, and then the resultant stacked body was spirally wound thereby to obtain an electrode assembly.

Hexafluorolithium phosphate ($LiPF_6$) was dissolved in a mixed solvent consisting of ethylene carbonate (EC) and methylethyl carbonate (MEC) (volume ratio: 50:50 to prepare a nonaqueous electrolyte, the concentration of $LiPF_6$ being 1.0 mol/l. Finally, the electrode assembly and the nonaqueous electrolyte were placed in a bottomed cylindrical case made of stainless steel, thereby fabricating a cylindrical lithium secondary battery as shown in FIG.

EXAMPLE 2

The same procedure as that of Example 1 was repeated to prepare a cylindrical lithium secondary battery having the same construction as that of Example 1 except that a carbonaceous material as explained below was employed.

Namely, the powder of mesophase pitch-based carbon fiber was heat-treated at a temperature of 3,000° C. in an argon gas atmosphere thereby to perform the graphitization treatment of the carbon fiber. Then, the resultant graphitized powder was mixed with 10% by weight of diboron trioxide ($B_2O_3$) powder and then heat-treated at a temperature of 2,400° C. in an argon gas stream thereby to obtain a fibrous carbonaceous material. The carbonaceous material thus obtained contained 2% by weight of boron and 0.02% by weight of oxygen. The intensity ratio ($P_{101}/P_{100}$) was found as being 2.1. Further, the interplanar spacing $d_{002}$ derived from (002) reflection of the carbonaceous material in the powder X-ray diffraction was found 0.3360 nm. The specific surface area of the carbonaceous material as measured by means of $N_2$ gas adsorption BET method was found 2 $m^2/g$. The average particle diameter of the carbonaceous material was 20 μm. When the cross-section of the carbonaceous material was observed by means of SEM (scanning electron microscope), the orientation of the graphite crystallite was found as being radial.

EXAMPLE 3

The same procedure as that of Example 1 was repeated to prepare a cylindrical lithium secondary battery having the same construction as that of Example 1 except that a carbonaceous material as explained below was employed.

Namely, the powder of mesophase pitch-based carbon fiber was heat-treated at a temperature of 350° C. in air atmosphere thereby to perform the infusibilization treatment of the carbon fiber. Then, the resultant powder was mixed with 5% by weight of boron carbide ($B_4C$) powder and then heat-treated at a temperature of 3,000° C. in an argon gas stream. Subsequently, the resultant mixture was heat-treated in air atmosphere at a temperature of 700° C. for two hours thereby to obtain a fibrous carbonaceous material. The carbonaceous material thus obtained contained 2% by weight of boron atom and 0.04% by weight of oxygen. The intensity ratio ($P_{101}/P_{100}$) was found to be 2.2. Further, the interplanar spacing $d_{002}$ derived from (002) reflection of the carbonaceous material in the powder X-ray diffraction was found 0.3358 nm. The specific surface area of the carbonaceous material as measured by means of $N_2$ gas adsorption BET method was found 1.5 $m^2/g$. The average particle diameter of the carbonaceous material was 20 μm. When the cross-section of the carbonaceous material was observed by means of SEM (scanning electron microscope), the orientation of the graphite crystallite was found as being radial.

EXAMPLE 4

The same procedure as that of Example 1 was repeated to prepare a cylindrical lithium secondary battery having the same construction as that of Example 1 except that a carbonaceous material as explained below was employed.

Namely, the powder of mesophase globule was heat-treated at a temperature of 3000° C. in an argon gas atmosphere thereby to perform the graphitization treatment of the globule. Then, the resultant graphitized powder was mixed with 10% by weight of diboron trioxide ($B_2O_3$) powder and then heat-treated at a temperature of 2,400° C. in an argon gas stream thereby to obtain a spherical carbonaceous material. The carbonaceous material thus obtained contained 2.5% by weight of boron and 0.02% by weight of oxygen. The intensity ratio ($P_{101}/P_{100}$) was found as being 2.5. Further, the interplanar spacing $d_{002}$ derived from (002) reflection of the carbonaceous material in the powder X-ray diffraction was found 0.3358 nm. The specific surface area of the carbonaceous material as measured by means of $N_2$ gas adsorption BET method was found 2.5 $m^2/g$. The average particle diameter of the carbonaceous material was 6 μm. When the cross-section of the carbonaceous material was observed by means of SEM (scanning electron microscope), the orientation of the graphite crystallite was found as being Brooks-Taylor type.

EXAMPLE 5

The same procedure as that of Example 1 was repeated to prepare a cylindrical lithium secondary battery having the same construction as that of Example 1 except that a carbonaceous material as explained below was employed.

Namely, the powder of mesophase globule was heat-treated at a temperature of 3,000° C. in an argon gas atmosphere thereby to perform the graphitization treatment of the globule. Then, the resultant graphitized powder was mixed with 5% by weight of diboron trioxide ($B_2O_3$) powder and then heat-treated at a temperature of 1,800° C. in an argon gas stream thereby to obtain a spherical carbonaceous material. The carbonaceous material thus obtained contained 1% by weight of boron and 0.1% by weight of oxygen. The intensity ratio ($P_{101}/P_{100}$) was found as being 2.1. Further, the interplanar spacing $d_{002}$ derived from (002) reflection of the carbonaceous material in the powder X-ray diffraction was found 0.3357 nm. The specific surface area of the carbonaceous material as measured by means of $N_2$ gas adsorption BET method was found 3 m$^2$/g. The average particle diameter of the carbonaceous material was 10 μm. When the cross-section of the carbonaceous material was observed by means of SEM (scanning electron microscope), the orientation of the graphite crystallite was found as being Brooks-Taylor type.

EXAMPLE 6

The same procedure as that of Example 1 was repeated to prepare a cylindrical lithium secondary battery having the same construction as that of Example 1 except that a carbonaceous material as explained below was employed.

Namely, the powder of mesophase pitch-based carbon fiber was heat-treated at a temperature of 3,000° C. in an argon gas atmosphere thereby to perform the graphitization treatment of the carbon fiber. Then, the resultant graphitized powder was mixed with 10% by weight of diboron trioxide ($B_2O_3$) powder and then heat-treated at a temperature of 2000° C. in an argon gas stream thereby to obtain a fibrous carbonaceous material. The carbonaceous material thus obtained contained 2% by weight of boron and 1% by weight of oxygen. The intensity ratio ($P_{101}/P_{100}$) was found as being 2.1. Further, the interplanar spacing $d_{002}$ derived from (002) reflection of the carbonaceous material in the powder X-ray diffraction was found 0.3354 nm. The specific surface area of the carbonaceous material as measured by means of $N_2$ gas adsorption BET method was found 1.5 m$^2$/g. The average particle diameter of the carbonaceous material was 20 μm. When the cross-section of the carbonaceous material was observed by means of SEM (scanning electron microscope), the orientation of the graphite crystallite was found as being radial.

COMPARATIVE EXAMPLE 1

The same procedure as that of Example 1 was repeated to prepare a cylindrical lithium secondary battery having the same construction as that of Example 1 except that a carbonaceous material as explained below was employed.

Namely, the powder of artificial spherical graphite powder not containing boron but containing 0.009% by weight of oxygen was prepared for use as a carbonaceous material. The intensity ratio ($P_{101}/P_{100}$) of the graphite powder was found as being 3. Further, the interplanar spacing $d_{002}$ derived from (002) reflection of the carbonaceous material in the powder X-ray diffraction was found 0.3354 nm. The specific surface area of the carbonaceous material as measured by means of $N_2$ gas adsorption BET method was found 4 m$^2$/g. The average particle diameter of the carbonaceous material was 20 μm. When the cross-section of the carbonaceous material was observed by means of SEM (scanning electron microscope), the orientation of the graphite crystallite was not recognized, i.e. the orientation of the graphite crystallite was found as being amorphous.

COMPARATIVE EXAMPLE 2

The same procedure as that of Example 1 was repeated to prepare a cylindrical lithium secondary battery having the same construction as that of Example 1 except that a carbonaceous material as explained below was employed.

Namely, the powder of mesophase pitch-based carbon fiber was heat-treated at a temperature of 3,000° C. in an argon gas atmosphere thereby to obtain a fibrous carbonaceous material. The carbonaceous material thus obtained contained none of boron and oxygen. The intensity ratio ($P_{101}/P_{100}$) was found as being 1.8. Further, the interplanar spacing $d_{002}$ derived from (002) reflection of the carbonaceous material in the powder X-ray diffraction was found 0.3362 nm. The specific surface area of the carbonaceous material as measured by means of $N_2$ gas adsorption BET method was found 1.2 m$^2$/g. The average particle diameter of the carbonaceous material was 20 μm. When the cross-section of the carbonaceous material was observed by means of SEM (scanning electron microscope), the orientation of the graphite crystallite was found as being radial.

COMPARATIVE EXAMPLE 3

The same procedure as that of Example 1 was repeated to prepare a cylindrical lithium secondary battery having the same construction as that of Example 1 except that a carbonaceous material as explained below was employed.

Namely, the powder of mesophase pitch-based carbon fiber was heat-treated at a temperature of 3,000° C. in an argon gas atmosphere. Then, the resultant powder was mixed with 20% by weight of diboron trioxide ($B_2O_3$) powder and then heat-treated at a temperature of 2,400° C. in an argon gas stream thereby to obtain a fibrous carbonaceous material. The carbonaceous material thus obtained contained 4% by weight of boron and 0.01% by weight of oxygen. The intensity ratio ($P_{101}/P_{100}$) was found as being 2.0. Further, the interplanar spacing $d_{002}$ derived from (002) reflection of the carbonaceous material in the powder X-ray diffraction was found 0.3356 nm. The specific surface area of the carbonaceous material as measured by means of $N_2$ gas adsorption BET method was found 1.5 m$^2$/g. The average particle diameter of the carbonaceous material was 20 μm. When the cross-section of the carbonaceous material was observed by means of SEM (scanning electron microscope), the orientation of the graphite crystallite was found as being radial.

COMPARATIVE EXAMPLE 4

The same procedure as that of Example 1 was repeated to prepare a cylindrical lithium secondary battery having the same construction as that of Example 1 except that a carbonaceous material as explained below was employed.

Namely, the powder of mesophase globule was heat-treated at a temperature of 2,600° C. in an argon gas atmosphere. Then, the resultant powder was mixed with 10% by weight of diboron trioxide ($B_2O_3$) and then heat-treated at a temperature of 2,500° C. in an argon gas stream thereby to obtain a spherical carbonaceous material. The carbonaceous material thus obtained contained 2% by weight of boron and 0.02% by weight of oxygen. The intensity ratio ($P_{101}/P_{100}$) was found as being 1.8. Further, the interplanar spacing $d_{002}$ derived from (002) reflection of the carbonaceous material in the powder X-ray diffraction was found 0.3360 nm. The specific surface area of the carbonaceous material as measured by means of $N_2$ gas adsorption BET method was found 1.5 m$^2$/g. The average particle diameter of the carbonaceous material was 10 μm. When the cross-section of the carbonaceous material was observed by means of SEM (scanning electron microscope), the orientation of the graphite crystallite was found as being Brooks-Taylor type.

COMPARATIVE EXAMPLE 5

The same procedure as that of Example 1 was repeated to prepare a cylindrical lithium secondary battery having the same construction as that of Example 1 except that a carbonaceous material as explained below was employed.

Namely, the spherical particles of natural graphite having an average particle diameter of 15 μm were mixed with 10% by weight of diboron trioxide ($B_2O_3$) powder and then heat-treated at a temperature of 1,000° C. in an argon gas stream thereby to obtain a spherical carbonaceous material. The carbonaceous material thus obtained contained 1% by weight of boron and 0% by weight of oxygen. The intensity ratio ($P_{101}/P_{100}$) was found as being 3. Further, the interplanar spacing $d_{002}$ derived from (002) reflection of the carbonaceous material in the powder X-ray diffraction was found 0.3354 nm. The specific surface area of the carbonaceous material as measured by means of $N_2$ gas adsorption BET method was found 5 m²/g. The average particle diameter of the carbonaceous material was 15 μm. When the cross-section of the carbonaceous material was observed by means of SEM (scanning electron microscope), the orientation of the graphite crystallite was found as being isotropic.

COMPARATIVE EXAMPLE 6

The same procedure as that of Example 1 was repeated to prepare a cylindrical lithium secondary battery having the same construction as that of Example 1 except that a carbonaceous material as explained below was employed.

The powder of mesophase pitch-based carbon fiber was heat-treated at a temperature of 350° C. in air atmosphere thereby to perform the infusibilization treatment of the carbon fiber. Then, the resultant powder was mixed with 5% by weight of boron carbide ($B_4C$) powder and then heat-treated at a temperature of 3,000° C. in an argon gas stream to obtain a fibrous carbonaceous material. The carbonaceous material thus obtained contained 2% by weight of boron and 0% by weight of oxygen. The intensity ratio ($P_{101}/P_{100}$) was found as being 2.2. Further, the interplanar spacing $d_{002}$ derived from (002) reflection of the carbonaceous material in the powder X-ray diffraction was found 0.3358 nm. The specific surface area of the carbonaceous material as measured by means of $N_2$ gas adsorption BET method was found 1 m²/g. The average particle diameter of the carbonaceous material was 20 μm. When the cross-section of the carbonaceous material was observed by means of SEM (scanning electron microscope), the orientation of the graphite crystallite was found as being radial.

The secondary batteries obtained in Examples 1 to 6 and Comparative Examples 1 to 6 were subjected to a quick charge/discharge cycle test wherein each battery was quickly charged to a depth of 4.2V with a current of 1.5A in two hours, and then discharged down to 2.7V with a current of 1.5A. This quick charge/discharge cycle test was performed in an environment of 0° C. and also in an environment of 20° C. In the charge/discharge cycle test of each environment, the discharge capacity after the first cycle and the capacity retention ratio at the 300th cycle (in relative to the discharge capacity after the first cycle) were measured, the results being shown in the following Table 1.

TABLE 1

| | Content of B (wt %) | Content of oxygen (wt %) | intensity ratio $P_{101}/P_{100}$ | 20° C. initial capacity (mAh) | 0° C. initial capacity (mAh) | 20° C. capacity retention ratio (%) | 0° C. capacity retention ratio (%) |
|---|---|---|---|---|---|---|---|
| Example 1 | 1 | 0.03 | 3 | 1800 | 1700 | 85 | 80 |
| Example 2 | 2 | 0.02 | 2.1 | 1850 | 1750 | 90 | 85 |
| Example 3 | 2 | 0.04 | 2.2 | 1830 | 1730 | 90 | 85 |
| Example 4 | 2.5 | 0.02 | 2.5 | 1820 | 1700 | 86 | 80 |
| Example 5 | 1 | 0.1 | 2.1 | 1800 | 1700 | 80 | 80 |
| Example 6 | 2 | 1 | 2.1 | 1800 | 1750 | 85 | 80 |
| Comp. Ex. 1 | 0 | 0.009 | 3 | 1500 | 1000 | 70 | 20 |
| Comp. Ex. 2 | 0 | 0 | 1.8 | 1650 | 1400 | 82 | 40 |
| Comp. Ex. 3 | 4 | 0.01 | 2.0 | 1600 | 1200 | 70 | 50 |
| Comp. Ex. 4 | 1 | 0.02 | 1.8 | 1500 | 1100 | 70 | 50 |
| Comp. Ex. 5 | 1 | 0 | 3 | 1650 | 1100 | 80 | 60 |
| Comp. Ex. 6 | 2 | 0 | 2.1 | 1600 | 1200 | 80 | 70 |

As apparent from Table 1, the batteries according to Examples 1 to 6 were not only capable of improving the initial capacity in the quick charging at 20° C. (normal temperature) but also capable of suppressing the decrease of the initial capacity in the quick charging at 0° C. (low temperature). Furthermore, the batteries according to Examples 1 to 6 were capable of improving the capacity retention ratio in the quick charging in the environments of 20° C. as well as 0° C. In particular, the batteries according to Examples 1 to 6 were capable of greatly improving the capacity retention ratio in the quick charging in the environment of 0° C.

By contrast, as apparent from Table 1, the batteries according to Comparative Examples 1 to 6 indicated a lower initial capacity as compared with the batteries of Examples 1 to 6 in the quick charging at 20° C., and also indicated a prominent decrease in the initial capacity in the quick charging at 0° C. Moreover, it would be clear that, according to the batteries of Comparative Examples 1 to 6, the capacity retention ratio in the quick charging in the environment of 0° C. was extremely low as compared with the batteries of Examples 1 to 6.

In the foregoing examples, this invention has been explained with reference to a cylindrical lithium secondary battery. However, it is of course possible to apply this invention to a rectangular lithium secondary battery. Further, the electrode assembly to be housed in the case of battery is not confined to the aforementioned spiral structure, but may be a laminated structure comprising a positive electrode, a separator and a negative electrode which are stacked in this order.

As explained above, it is possible according to this invention to provide a lithium secondary battery which is capable of ensuring a high discharge capacity and a long charge/discharge cycle life even if the battery is employed in a low temperature environment or subjected to a quick charging or discharging. Further, it is also possible according to this invention to provide a method of manufacturing a negative electrode which enables to obtain a lithium secondary battery, which is capable of ensuring a high discharge capacity and a long charge/discharge cycle life even if the battery is employed in a low temperature environment or subjected to a quick charging or discharging.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A lithium secondary battery, comprising a positive electrode, a nonaqueous electrolyte, and a negative electrode comprising a carbonaceous material which is capable of absorbing or desorbing lithium ion, wherein said carbonaceous material comprises 1 to 10% by weight of boron and containing greater than 0.1% by weight and not more than 1% by weight of oxygen, and has an intensity ratio ($P_{101}/P_{100}$) of a (101) diffraction peak $P_{101}$ to a (100) diffraction peak $P_{100}$ as measured by means of powder X-ray diffraction with CuK $\alpha$ radiation as X-ray source, of 2 or more.

2. A secondary battery according to claim 1, wherein a content of boron in said carbonaceous material is in the range of from 1 to 7% by weight.

3. A secondary battery according to claim 1, wherein a content of oxygen in said carbonaceous material is in the range of from 0.1 to 0.5% by weight.

4. A secondary battery according to claim 1, wherein said intensity ratio ($P_{101}/P_{100}$) is 2.1 or more.

5. A secondary battery according to claim 1, wherein a specific surface area of said carbonaceous material is in the range of from 0.3 $m^2/g$ to 10 $m^2/g$.

6. A secondary battery according to claim 1, wherein a shape of said carbonaceous material is particulate.

7. A secondary battery according to claim 6, wherein said particulate carbonaceous material further has a radial type orientation or an isotropic orientation.

8. A secondary battery according to claim 1, wherein a shape of said carbonaceous material is fibrous.

9. A secondary battery according to claim 8, wherein said fibrous carbonaceous material further has a radial type orientation.

10. A secondary battery according to claim 1, wherein said positive electrode comprises at least one kind of oxide selected from the group consisting of lithium-containing cobalt oxide, lithium-containing nickel oxide and lithium/manganese composite oxide.

11. A method of manufacturing the battery of claim 1, the negative electrode comprising a carbonaceous material which is capable of absorbing or desorbing lithium ion;

wherein said carbonaceous material is formed by a method comprising a step of;

heat-treating a mixture comprising a graphitized carbon-based material and a boron oxide at a temperature of 1,500 to 3,000° C. in an inert gas atmosphere.

12. A method according to claim 11, wherein said graphitized carbon-based material is at least one kind of material selected from the group consisting of artificial graphite, natural graphite, graphitized coke, graphitized mesophase pitch-based fiber, and graphitized mesophase pitch-based particle.

13. A method according to claim 11, wherein said boron oxide is $B_2O_3$.

14. A method according to claim 11, wherein said heat treatment is performed at a temperature ranging from 1,500 to 2,800° C.

15. A method of manufacturing the battery of claim 1, the negative electrode comprising a carbonaceous material which is capable of absorbing or desorbing lithium ion;

wherein said carbonaceous material is formed by a method comprising the steps of;

heat-treating a mixture comprising a carbon-based material and a boron compound at a temperature of 1,500 to 3,000° C. in an inert gas atmosphere; and further heat-treating the heat-treated mixture at a temperature of 400 to 800° C. in an oxidizing atmosphere.

16. A method according to claim 15, wherein said boron compound is at least one kind of compound selected from the group consisting of $H_3BO_3$, $B_2O_3$ and $B_4C$.

17. A method according to claim 15, wherein said heat treatment in an inert gas atmosphere is performed at a temperature ranging from 1,500 to 2,800° C.

18. A method according to claim 15, wherein said heat treatment in an oxidizing atmosphere is performed at a temperature ranging from 650 to 700° C.

* * * * *